United States Patent [19]
Henson et al.

[11] Patent Number: 5,574,817
[45] Date of Patent: Nov. 12, 1996

[54] FIBER OPTIC RIBBON CABLE ASSEMBLY AND METHOD OF MANUFACTURING SAME

[75] Inventors: Gordon D. Henson, Lake Elmo; Barbara A. DeBaun, Woodbury; Scott A. Igl, St. Paul; Nicholas A. Lee, Woodbury; Terry L. Smith, Roseville, all of Minn.

[73] Assignee: Minnesota Mining and Manufacturing Company, St. Paul, Minn.

[21] Appl. No.: 456,571

[22] Filed: Jun. 1, 1995

[51] Int. Cl.⁶ ........................................ G02B 6/44
[52] U.S. Cl. ...................... 385/114; 156/166; 385/53
[58] Field of Search ...................... 385/53–55, 59, 385/70, 71, 76–78, 100, 114, 147; 156/99–107, 166

[56] References Cited

U.S. PATENT DOCUMENTS

| | | | |
|---|---|---|---|
| 3,864,018 | 2/1975 | Miller | 385/98 |
| 3,871,935 | 3/1975 | Gloge et al. | 156/158 |
| 3,920,432 | 11/1975 | Smith | 65/408 |
| 4,023,887 | 5/1977 | Speers | 385/114 XR |
| 4,289,558 | 9/1981 | Eichenbaum et al. | 156/179 |
| 4,715,677 | 12/1987 | Saito et al. | 385/114 |
| 4,793,683 | 12/1988 | Cannon, Jr. et al. | 385/60 |
| 4,980,007 | 12/1990 | Ferguson | 156/179 |
| 5,208,889 | 5/1993 | Cedrone et al. | 385/114 |
| 5,259,050 | 11/1993 | Yamakawa et al. | 385/59 |
| 5,309,537 | 5/1994 | Chun et al. | 385/59 |

FOREIGN PATENT DOCUMENTS

0613031A1  8/1994  European Pat. Off. .

OTHER PUBLICATIONS

Alcoa Fujikura Ltd. Technical Brochure, Feb. 1995, 1 page.
AT&T Multifiber Optical Cable Assemblies Product Catalog, Sep. 1993, pp. 12–16.
MACII™ Connector Family Technical Overview, pp. 83–88, no date.

*Primary Examiner*—John D. Lee
*Attorney, Agent, or Firm*—Gary L. Griswold; Walter N. Kirn; H. Sanders Gwin, Jr.

[57] ABSTRACT

A fiber optic ribbon cable assembly has optical connector assemblies manufactured in line with the ribbon cable assembly so as to provide a fixed, lateral spacing of the optical fibers relative to each other within the connector assembly and has the remaining portion of the fiber optic ribbon cable manufactured within an arbitrary lateral spacing of the optical fibers relative to each other. A pair of adhesive tape layers are sandwiched around the optical fibers and the in-line optical connector assemblies. By having the connector assemblies manufactured in line with the fiber optic ribbon cable, resulting ribbon cable assembly is easier to manufacture, has a higher alignment accuracy, and is more cost effective than existing techniques for manufacturing ribbon cable assemblies.

37 Claims, 7 Drawing Sheets

FIBER OPTIC RIBBON CABLE ASSEMBLY AND METHOD OF MANUFACTURING SAME

FIELD OF THE INVENTION

The present invention relates generally to optical fiber transmission media and, more particularly, to fiber optic ribbon cable assemblies having the fiber optic ribbon manufactured with arbitrary spacing between optical fibers, having the connectors manufactured in line with the ribbon cable assembly, and having with the ribbon cable assembly manufactured with or without an outside jacket or reinforcing shell.

BACKGROUND OF THE INVENTION

Optical fiber ribbon cables are well known for the transmission of optical signals. Use of optical cables, including optical fiber ribbon cables, has generally been limited to long-haul trunking installations where the improved transmission characteristics of the optical fibers justify the greater expense and difficulty associated with their manufacture and installation. As the demands on communication media continue to increase, the advantages of using optical cable for transmission of signals across shorter distances or, for interconnecting local devices, continues to grow. Unfortunately, the costs associated with the production of optical fiber cable assemblies, and in particular with the installation of connectors on optical fiber ribbon cables, continue to limit the wide spread application of optical fiber transmission media for these applications.

Traditionally, a single fiber optical cable is assembled by coating an optical fiber with a buffer layer and then encasing the buffered optical fiber within a Kevlar® sheath that provides tensile strength and a vinyl outer jacket that serves as an environmental shield. Multi-fiber optical cables are assembled in a similar manner by bundling multiple buffered optical fibers within the center of a Kevlar® sheath and corresponding outer jacket. The difficulty with a multi-fiber bundled optical cable is in providing an economic, convenient and reliable system for installing a connector on the ends of the optical fibers so as to provide a finished fiber optic cable assembly.

As an alternative to a multi-fiber bundled optical cable, optical fiber ribbons have been developed in which multiple optical fibers are aligned and maintained in a planar configuration. U.S. Pat. No. 3,920,432, issued to Smith describes an early method of fabricating an optical fiber ribbon cable in which a plurality of glass optical fibers are carried by a grooved holder with a plurality of spacing fibers of triangular cross-section continuously fed into the spaces between adjacent optical fibers in the holder. The spacing fibers are then melted to secure the optical fibers within the holder. The advantage of this technique is that the optical fibers are accurately aligned within the holder, thereby aiding in the ability to easily interface the fiber optic ribbon with an optical connector. The disadvantage is that this technique limits the mechanical performance of the fiber optic ribbon by requiring that the holder be provided for the entire length of the ribbon and that the holder have sufficient structural integrity to accurately maintain the positioning of the optical fibers within the holder. In addition, the requirement that the fiber optic ribbon be heated in order to melt the triangular-type spacing fibers to secure the optical fibers within the holder subjects the fiber optic ribbon to thermal stress.

U.S. Pat. Nos. 4,289,558 issued to Eichenbaum et al. and 4,980,007, issued to Ferguson describe improved methods of fabricating a fiber optic ribbon in which buffered optical fibers are positioned adjacent one another in a planar orientation and then sandwiched between the adhesive layers of a pair of thin binding tapes. The resulting fiber optic ribbon is then encased in Kevlar® fibers and a plastic sheath, for example, to provide tensile strain relief and environmental protection for the optical fibers. In this technique, the alignment of the optical fibers within the ribbon is created and maintained by abutting adjacent fibers and then relying on the dimensional characteristics of the buffer layer surrounding the optical fibers so as to achieve a uniform spacing across a cross sectional width of the fiber optic ribbon. While these techniques provide a clear manufacturing advantages to the technique disclosed by Smith in U.S. Pat. No. 3,920,432, the problems which are created by utilizing these techniques are an increased difficulty in attaching, aligning and installing optical connectors on the ends of the fiber optic ribbon in order to create a finished fiber optic ribbon cable assembly.

Numerous optical connectors have been developed to aid in the connection and splicing of fiber optic ribbons. Examples of connectors which are designed to terminate an end of a fiber optic ribbon are shown and described in U.S. Pat. Nos. 3,864,018, issued to Miller, 4,793,683, issued to Cannon, Jr., et al., and 5,309,537, issued to Chun, et al. In contrast, U.S. Pat. No. 3,871,935, issued to Cloge, et al. and European Patent Publ. No. 0 613 031 81 both describe methods for encapsulating a middle portion of a fiber optic ribbon within an optical connector assembly that is then severed in half to form opposed ends of a pair of optical connectors. In both of these references, the protective jacket and buffer surrounding the optical fibers are chemically removed in a middle portion of the ribbon and the resulting bare optical fibers are positioned within an encapsulating mold into which a bonding material is injected to secure the optical fibers. Once secured, the molded assembly is divided in half along a plain perpendicular to the axis of the optical fibers, thereby exposing ends of the fibers which can be polished for alignment and/or abutment to other optical fiber ends. The advantages of these encapsulation connector techniques are that they involve less manipulation and mechanical stress of the optical fibers than the technique taught by Smith. The disadvantages are that the stripping step subjects the optical fibers to potential damage and that the alignment of optical fibers in the molded assembly is not certain due to the potential movement of optical fibers during the encapsulating process. In any event, these techniques are still post-production techniques applied after the fiber optic ribbon has been assembled.

Although existing techniques for the manufacture of fiber optic ribbon cable assemblies having optical connectors at one or both ends of a fiber optic ribbon cable are capable of producing optical transmission media that are well suited for certain applications, it would be desirable to provide a method of fabrication of fiber optic ribbon cable assemblies which was more cost effective and allowed for easier manufacture and assembly of fiber optical ribbon cable assemblies so as to broaden the potential applications for use of fiber optic ribbon cables.

SUMMARY OF THE INVENTION

The present invention is a fiber optic ribbon cable assembly having optical connector assemblies manufactured in line with the ribbon cable assembly so as to provide a fixed, lateral spacing of the optical fibers relative to each other within the connector assembly and having the remaining portion of the fiber optic ribbon cable manufactured within an arbitrary lateral spacing of the optical fibers relative to each other. A pair of adhesive tape layers are sandwiched around the optical fibers and the in-line optical connector assemblies. By having the connector assemblies manufactured in line with the fiber optic ribbon cable, the resulting ribbon cable assembly is easier to manufacture, has a higher alignment accuracy, and is more cost effective than existing techniques for manufacturing ribbon cable assemblies. Additionally, the pair of adhesive tape layers preferably encapsulate the optical fibers and may serve as the outermost jacket for the ribbon cable assembly, thereby reducing the number of components associated with the ribbon cable assembly.

In a first embodiment of the present invention, a fiber optic ribbon cable assembly includes a pair of adhesive tape layers. A plurality of optical fibers are arranged in a generally longitudinal orientation between a pair of adhesive tape layers with adjacent optical fibers positioned with an arbitrary lateral spacing relative to each other. At least a portion of at least one connector assembly is also disposed between the pair of adhesive tape layers. The plurality of optical fibers are disposed within the connector assembly with adjacent optical fibers positioned with a fixed lateral spacing relative to each other.

In accordance with the second embodiment of the present invention, a method of manufacturing a fiber optic ribbon cable assembly involves the steps of providing a plurality of optical fibers oriented in a generally longitudinal manner. Adjacent ones of the plurality of optical fibers are then arranged in a fixed lateral spacing relative to each other and a connector assembly is applied onto a first longitudinal segment of the plurality of optical fibers. At least a second longitudinal segment of the plurality of optical fibers separate from the first longitudinal segment are sandwiched between a pair of adhesive tape layers to form a ribbon cable assembly. Adjacent ones of the plurality of optical fibers are maintained in an arbitrary lateral spacing relative to each other in the second longitudinal segment.

In a preferred embodiment, the plurality of optical fibers are fed from spools of continuous optical fiber. The connector assembly comprises an upper connector component and a lower connector component with structure defined therein so that when the plurality of optical fibers are sandwiched between the upper connector component and the lower connector component, the fixed lateral inter-fiber spacing is established. The arbitrary lateral inter-fiber spacing within the non-connector portion of the ribbon cable may range from 0.0 to 2.0 centimeters. Preferably, in-line connector assemblies include structure defining a center portion such that the center portion may be cut generally perpendicular to the longitudinal orientation of the optical fibers, thereby exposing ends of the plurality of optical fibers with a lateral cross section of the connector assembly and in the fixed lateral spacing. The pair of adhesive tape layers may include a pair of margin portions that extend laterally beyond a planar orientation of the plurality of optical fibers and are adhered to each other to form a seal along at least a portion of the longitudinal edge of the ribbon cable assembly.

DETAILED DESCRIPTION OF THE PREFERRED EMBODIMENTS

Figure 1:
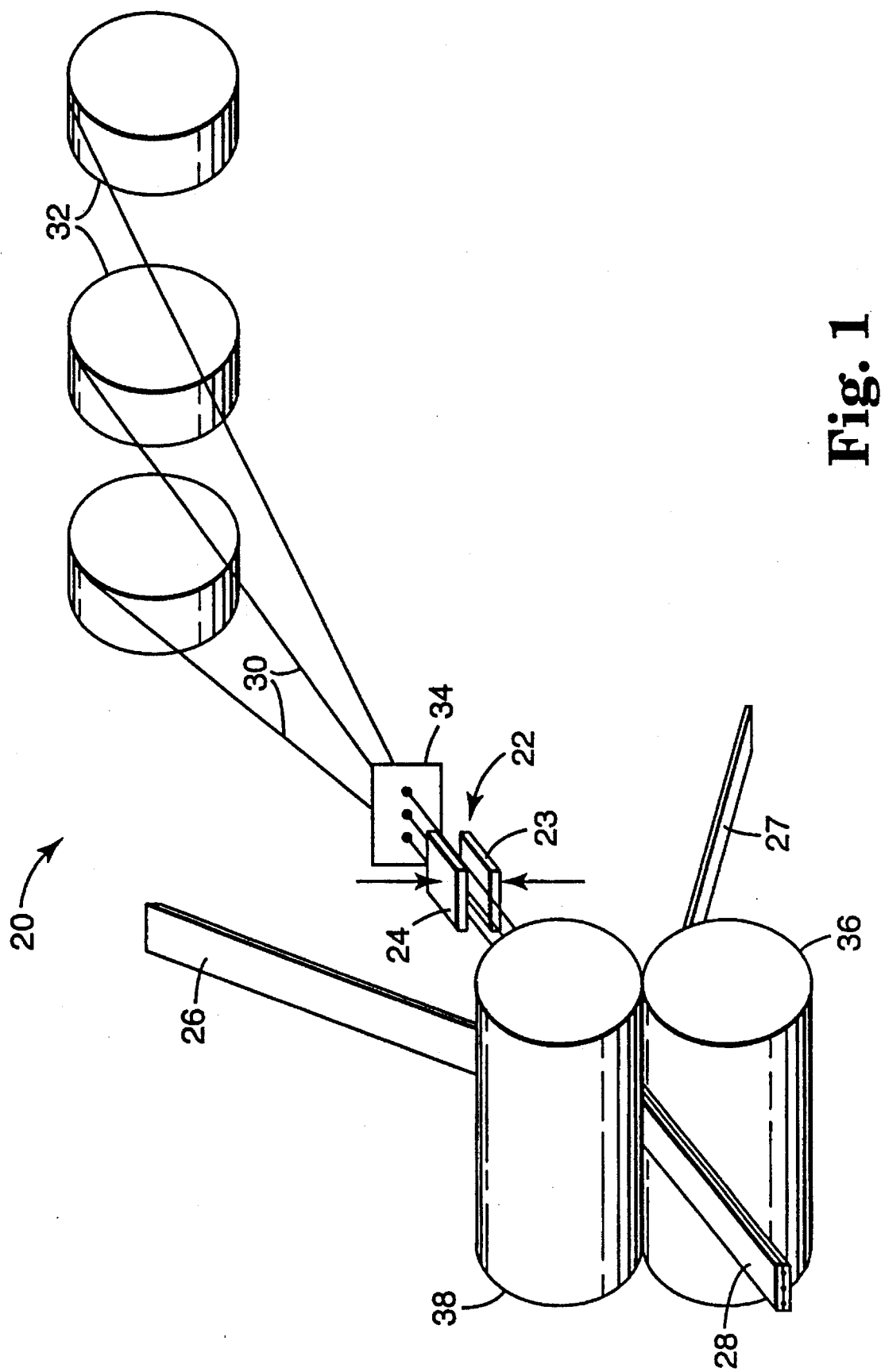
FIG. 1 is a schematic illustration of the method of manufacturing a fiber optic ribbon cable assembly having integrated in-line connector assemblies in accordance with the present invention.

Referring to FIG. 1, the method of producing a fiber optic ribbon cable assembly 20 in accordance with the present invention will be described. A plurality of optical fibers 30 are drawn from a corresponding series of spools 32 holding such optical fibers 30 through a guiding comb 34. Guiding comb 34 is provided with structure to establish a fixed, lateral inter-fiber spacing between optical fibers 30. Preferably, this spacing corresponds with a fixed, lateral inter-fiber spacing of a connector assembly 22 which is preferably comprised of a pair of upper and lower connector components 23, 24. After optical fibers 30 are brought through guiding comb 34, the connector components 23, 24 are positioned so as to sandwich optical fibers 30 therebetween, thereby fixing the lateral inter-fiber dimension within connector assembly 22. At a point farther down stream in the process, a lower adhesive tape 26 and an upper adhesive tape 27 are introduced to sandwich optical fibers 30 therebetween creating a fiber optic ribbon cable 28. A pair of compression rollers 36, 38 are preferably used to supply the force necessary to secure lower adhesive tape 26 to upper adhesive tape 27 with optical fibers 30 being held therebetween and having an arbitrary and non-fixed, lateral inter-fiber separation distance, except for in those locations of optical fiber ribbon 20 where connector components 23, 24 have been located. When present, optical connector components 23, 24 are also sandwiched between upper and lower adhesive tapes 26, 27.

Figure 15:
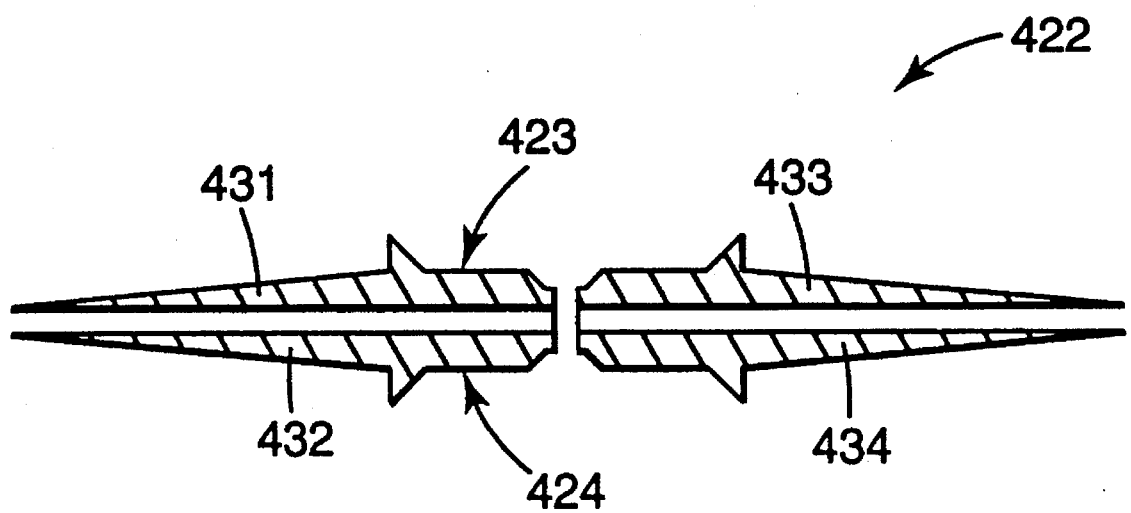
FIG. 15 is a side view of another alternate embodiment of a connector assembly.

In describing the present invention, the term connector assembly is used to describe structure which typically creates a pair of optical connectors on opposing ends of fiber optic ribbon segments when the structure is severed, although it is possible to have a connector assembly which results in only a single useable optical connector. In a preferred embodiment, connector assembly 22 is comprised of a pair of connector components 23, 24, although it will be understood that other arrangements of connector assembly 22 are possible, such as four connector components (as shown in FIG. 15) or a unitary connector assembly having an aperture through which optical fibers 30 are threaded. It will be recognized that connector assembly 22 is usually cut along at least one axis that is generally perpendicular to the longitudinal orientation of optical fibers 30, however, it is possible to make this cut a small angle to perpendicular, for example, in order to aid in the prevention of reflections. Connector assembly 22 is preferably made of plastic, but may also be manufactured from ceramic or metal materials and may, for example, be comprised of a plastic body having a ceramic or metal insert corresponding to the portion of connector assembly 22 which interfaes with optical fibers 30.

In conventional installation of fiber optic cables, an optical connector on an end of one cable is joined to an optical connector on an end of another cable using an optical coupler. While an optical coupler is normally required in order to complete an interconnetion between two cables, it should be recognized that it would be possible to include the mating structure of an optical coupler as part of a connector assembly in accordance with the present ivnention. It also will be recognized that numerous combinations and configurations of mechanical connector members and connector orientation configurations can be accomplished with the present invention.

Figure 2:
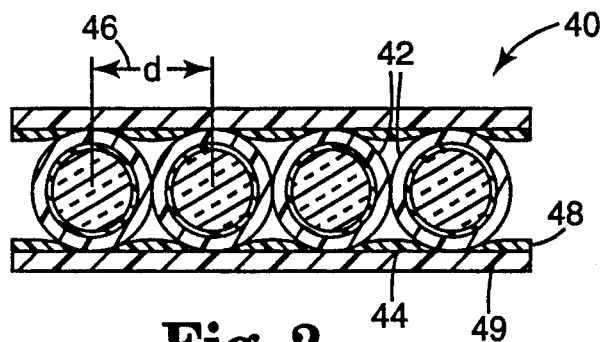
FIG. 2 is a cross sectional view of a fiber optic ribbon cable of the prior art.

One of the advantages of the present invention is that, by assembling optical fibers 30 within connector components 23, 24 prior to completing the remaining assembly of optical fiber ribbon cable assembly 20, it is not necessary to maintain specific inter-fiber distances or tolerances throughout the entire length of ribbon cable 28. As shown in FIG. 2, the prior art technique of assembling a fiber optic ribbon cable 40 relies on positioning adjacent optical fibers 42 in a contiguous planar, abutting relationship. By doing so, the prior art relies on the thicknesses of a buffer layer 44 surrounding each adjacent optical fiber 42 to establish a fixed inter-fiber optical separation d shown at 46. While this process works to define inter-fiber spaces 46 along a longitudinal length of fiber optic ribbon cable 40, it does not work well enough to provide for consistent, accurate inter-fiber spacings 46 which could be used for optical alignment within an optical connector.

Figure 3:
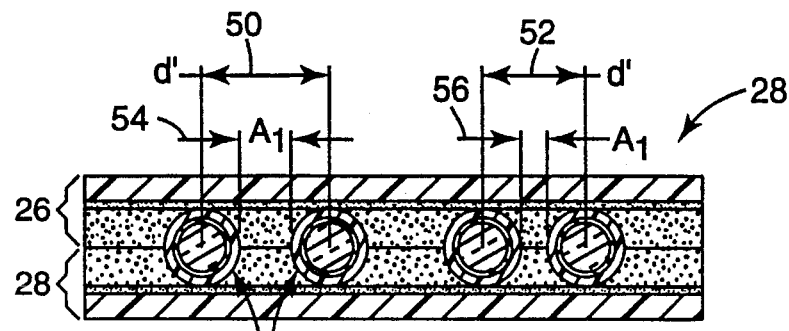
FIG. 3 is a cross sectional view of a fiber optic ribbon cable of the present invention.

In contrast to fiber optic ribbon cable 40, fiber optic ribbon cable 28 of the present invention as shown in FIG. 3 does not attempt to maintain a precisely fixed, lateral relation among optical fibers 30 when sandwiched between tape layers 26, 27. As a result, distance is d' shown at 50 and d" shown at 52 between adjacent optical fibers 30 may or may not be identical. Each distance d' and d" will generally include a space between laterally-adjacent optical fibers, $\Delta_1$ shown at 54 and $\Delta_2$ shown at 56, although it will be recognized that because no fixed lateral, inter-fiber spacing is dictated when optical fibers 30 are positioned within tape layers 26, 27, it would also be possible for adjacent optical fibers 30 to, in some situations, be in an abutting relationship.

Another advantage of the present invention is that, by assembling optical fibers 30 within connector assembly 22 prior to completing the remaining assembly of optical fiber ribbon cable assembly 20, significant time and money are saved with the installation of optical connectors on the optical fibers. The fixed, lateral inter-fiber spacing within connector components 23, 24 establishes a fixed pitch of optical fibers 30. Unlike the prior art techniques, optical fibers 30 are not subjected to either thermal or chemical stresses during the process of installing the optical connector assembly. In addition, there is absolute certainty of the relative position of the optical fibers 30 within connector components 23, 24. Finally, the manufacture of the integrated, in-line optical connector assembly 22 can be incorporated into a continuous manufacturing process, thereby significantly reducing the production costs of fiber optic ribbon cable assembly 20 as compared to prior techniques for the manufacture or field-installation of optical connectors on fiber optic ribbons.

Figure 4:
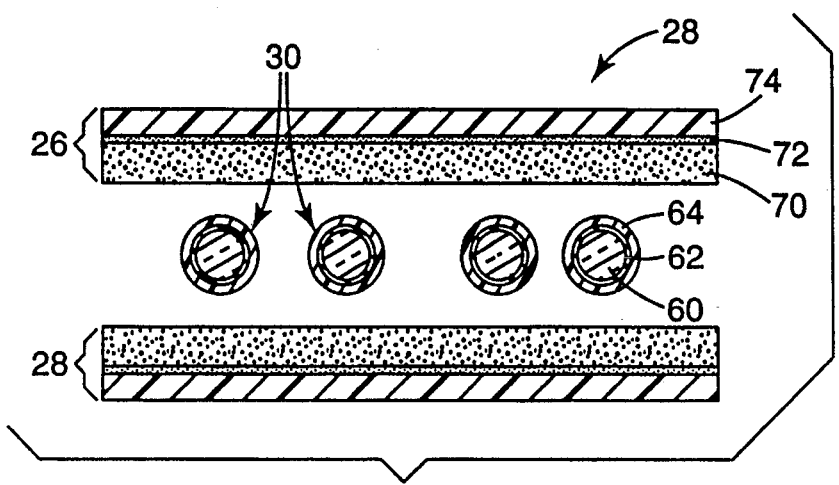
FIG. 4 is an exploded cross sectional view of the fiber optic ribbon cable of the present invention showing the layered details of the adhesive tape and optical fibers.

Referring now to FIG. 4, a preferred embodiment of tape layers 26, 27 and optical fibers 30 will be described. FIG. 4 shows an exploded cross-sectional view of ribbon cable 28 prior to sandwich assembly of tape layers 26, 27 with optical fibers 30 therebetween. In a preferred embodiment, optical fibers 30 are comprised of an optical core 60 composed of a material selected from the set of glass, plastic or air. Fiber optic core 60 is surrounded by a cladding layer 62 composed of a material selected from the set comprising glass, plastic or metal.

The optical fiber 30 may also include a buffer layer 64 composed of a material selected from the set of plastic, metal, carbon, ceramic or any combination thereof. In a preferred embodiment, optical fibers 30 are TECS™ hard clad fiber FT-200-EMA, available from 3M Company, St. Paul, Minn., although it will be recognized that the present invention is equally applicable to fiber optic ribbon cable assemblies 20 utilizing a variety of different optical fibers.

In a preferred embodiment, tape layers 26, 27 are each three-layer planar tape assemblies comprised of an inner encapsulating layer 70, an adhesive layer 72 and an outer protective layer 74. Encapsulating layer 70 serves to encapsulate optical fibers 30 and is preferably comprised of a deformable material such as pressure sensitive adhesive, thermoset adhesive, thermoplastic adhesive, radiation-curable adhesive, gel, foam, fibrous material, deformable plastic or any combination thereof. Adhesive layer 72 is interposed between inner layer 70 and 74 to secure each to the other and is preferably comprised of a material such as pressure sensitive adhesive, thermoset adhesive, thermoplastic adhesive, radiation-curable adhesive, mechanically interlocking structures or any combination thereof. Outer protective layer 74 serves as the outer jacket for fiber optic ribbon cable assembly 20 and is preferably comprised of a vinyl or plastic material which is suitable for a variety of environmental applications, or may be comprised of plastic, metal, fabric or any combination thereof. Preferably layers 72 and 74 are comprised of Scotch® brand tape No. 471 and layer 70 is comprised of VHB™ brand tape No. F-9469PC, both of which are available from 3M Company, St. Paul, Minn.

Figure 5:
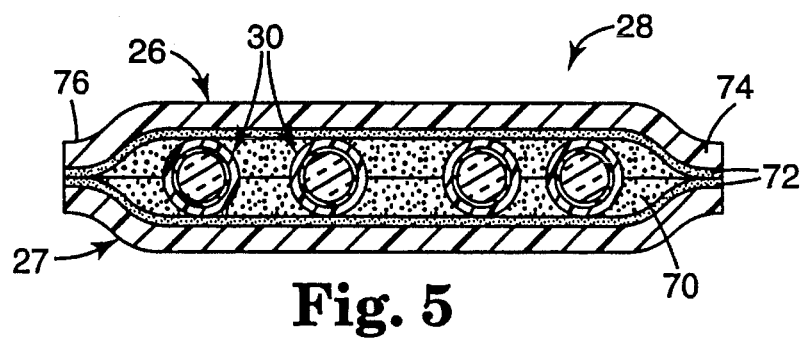
FIG. 5 is a cross sectional view of the fiber optic ribbon cable of FIG. 4 as assembled in accordance with the preferred embodiment of the present invention.

In an alternate embodiment shown in FIG. 5, protective layer 74 and adhesive layer 72 are extended beyond encapsulating layer 70 in an area shown at 76, for example, such that the lateral edges of fiber optical ribbon cable 28 are effectively sealed from environmental contamination. While it is understood that, for economic reasons, in a preferred embodiment outer layer 74 is intended to serve as an outermost jacket of ribbon cable assembly 20, it would also be possible to enclose one or more ribbon cable assemblies 20 within an additional outer jacket layer, such as in the case where a larger fiber optic cable bundle is required for a long haul transmission application. In such an embodiment, it would also be possible to arrange the fiber optic cable assembly 20 within an additional outer jacket such that the final cable assembly would offer more structural integrity so as to prevent, for example, bending or crimping of optical fibers 30. One such embodiment would involve folding the generally planar orientation of cable assembly 20 into an S-shaped configuration. Another alternate configuration would provide for a stacked orientation of multiples ones of cable assembly 20. Still another embodiment would include an additional core member around which cable assembly 20 could be wrapped, with the core member having a circular cross section, for example, to simulate a more traditional tubular shape for the final cable assembly.

Figure 6:
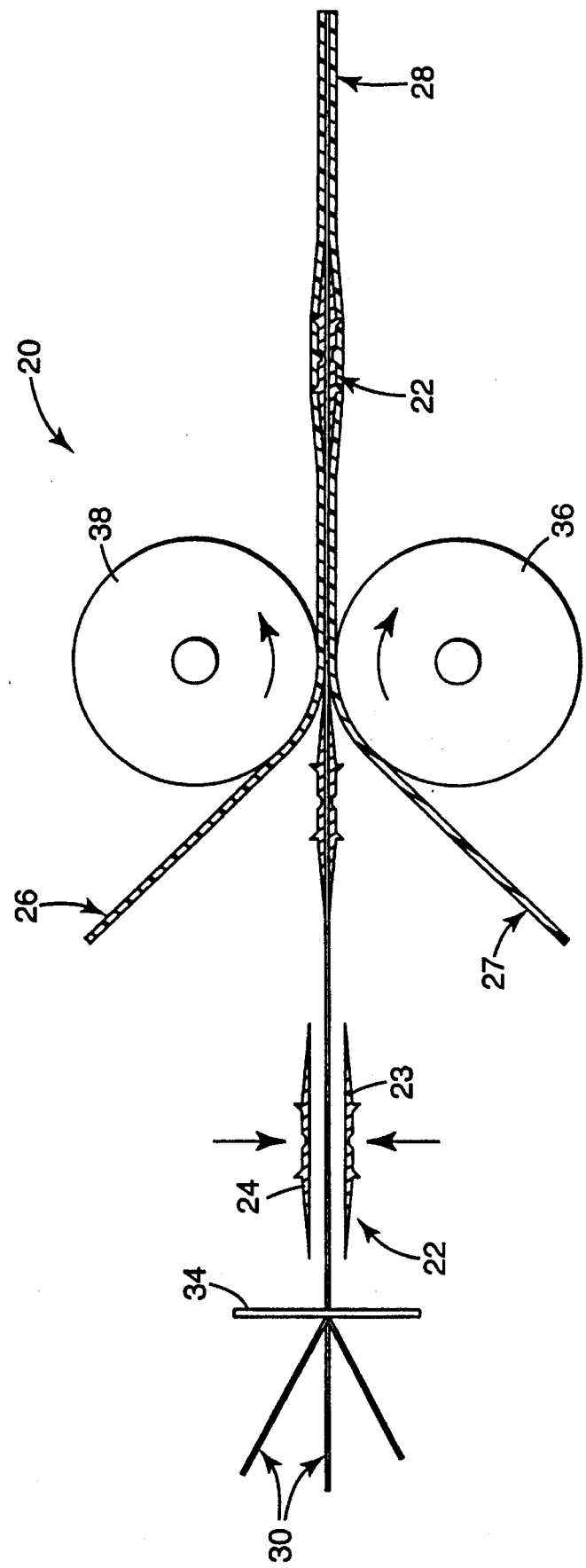
FIG. 6 is a schematic side view of the process of the present invention showing the application of the integrated in-line connector assemblies onto the fiber optic ribbon cable.

Referring now to FIG. 6, a side view of the assembly process of fiber optic ribbon cable assembly 20 is shown in which it is demonstrated how connector components 23, 24 are inserted at discrete locations along the longitudinal length of optical fibers 30 during the process of the present invention. It will be seen by controlling the positioning and number of connector assemblies 22, it is possible to produce a continuous run of cable assembly 20 having a series of cable segments 80 (as shown in FIG. 7), each with a length effectively determined by the positioning of sequential connector assemblies 22.

Figure 7:
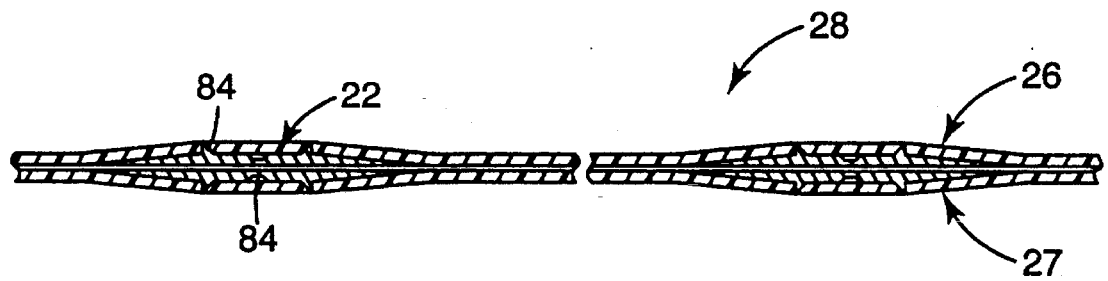
FIG. 7 is a series of side views of a fiber optic ribbon cable assembly produced in accordance with the present invention demonstrating a preferred finishing technique for the integrated in-line connector assembly.
Figure 7:
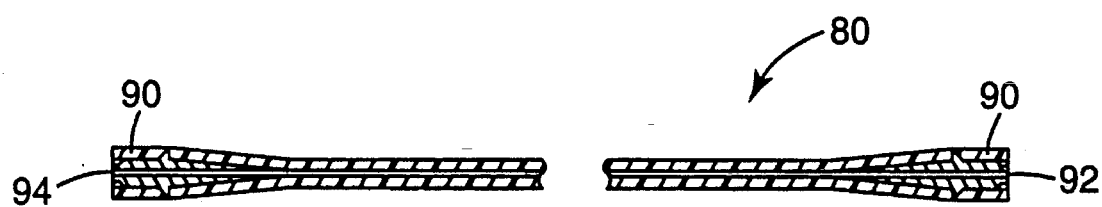
Figure 7:
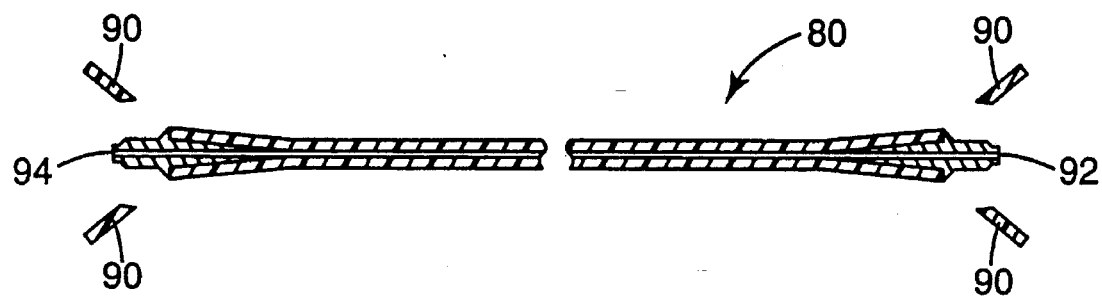
Figure 7:
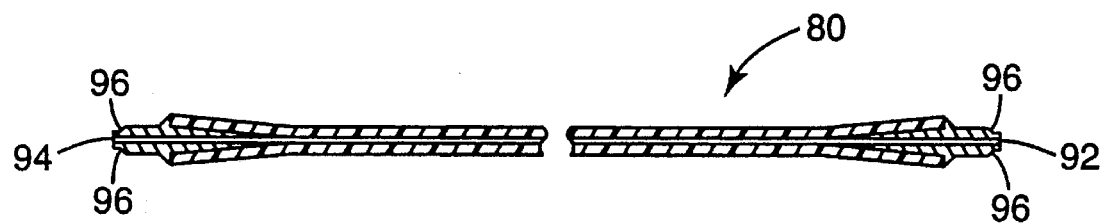

FIG. 7 shows how cable segments 80 can be created from the continuous run of cable assembly 20. Cable assembly 20 is cut along a center portion 82 of connector assembly 22. Center portion 82 is effectively defined in a preferred embodiment between a pair of ridge structures 84 which extend outward from the body of connector assembly 22, for example. In a preferred embodiment, ridge structures 84 include a pointed edge which, in connection with the operation of rollers 36, 38, cuts or scores adhesive tapes 26, 27 to facilitate the removal of portions 90. To make cable assembly segment 80, cable assembly 20 is cut in an orientation generally perpendicular to the longitudinal orientation of optical fibers 30 in center portion 82 of each connector assembly 22. Once cut, a portion 90 of tape layers 26, 27 is removed from each end 92, 94 of cable segment 80, after which each end 92, 94 may or may not require further polishing to complete manufacture and assembly of cable segment 80.

Figure 8:
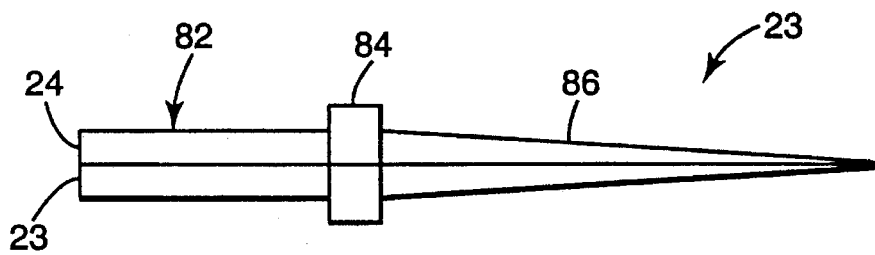
FIG. 8 is a side view of a preferred embodiment of the integrated in-line connector assembly.
Figure 9:
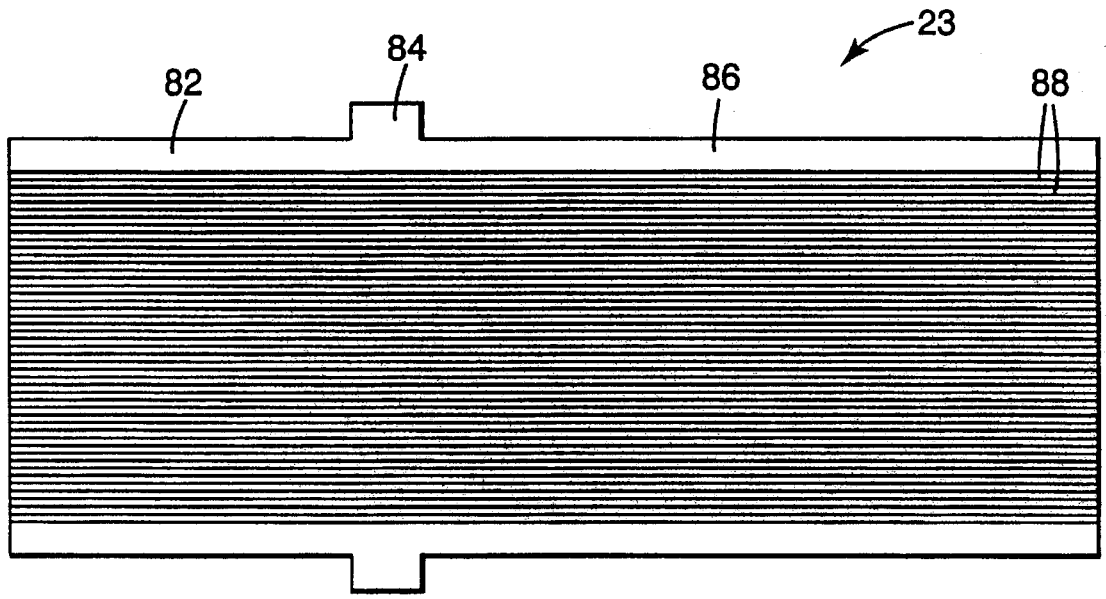
FIG. 9 is an top view of the lower connector component of the connector assembly of FIG. 8.
Figure 10:
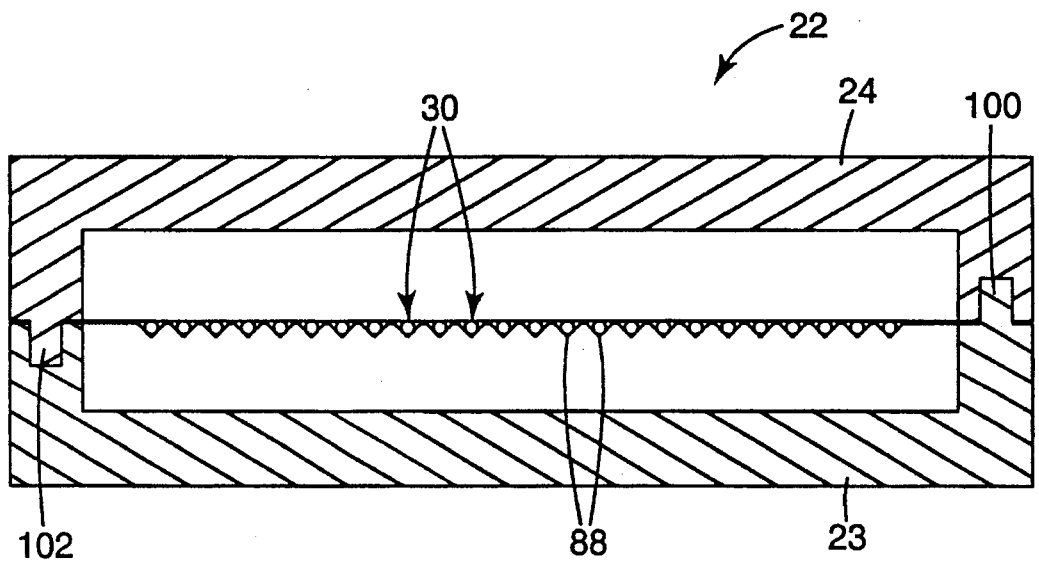
FIG. 10 is an end view of the connector assembly of FIG. 8.

Referring to FIGS. 8, 9 and 10, a more detailed description of the preferred embodiment of connector assembly 22 will be presented. As shown in FIG. 8, each connector assembly 22 includes two connector components 23, 24 each of which is generally comprised of a pair of mirror image quarter sections, each quarter section being constructed of three main portions: a center portion 82, a ridge portion 84, and a tapered portion 86. As shown in FIG. 9, on an inner surface of each connector components 23, 24 a plurality of grooves 88 are defined longitudinally across the entire length of the bottom half connector component 23. As shown in FIG. 10, the shape and orientation of grooves 88 is preferably triangular to accommodate optical fibers 30 within the space thereby defined. The inter-groove spacing between adjacent grooves 88 serves as the structure to define the fixed, lateral inter-fiber space between adjacent optical fibers 30 within connector components 23, 24.

It will be apparent that the particular spacing and dimensions of grooves 88 within connector assembly 22 can be selected so as to achieve the resulting desired spacing of optical fibers 30. Alternatively, grooves could be defined in upper connector half 24, or in both upper and lower connector components 23, 24. The extent and cross-sectional shape of grooves 88 may also be selected to best accommodate differing design considerations. For example, in a situation where it is desirable to prevent optical fibers 30 from being withdrawn from connector assembly 22, the depth of grooves 88 would be chosen so as to be shallow, thereby transferring the laminating force induced by rollers 36, 38 directly to optical fibers 30. In contrast, if it is desired that the laminating force of rollers 36, 38 not be applied to optical fibers 30, then the depth of grooves 88 could be selected so as to minimize or preclude such a result. It will also be seen that other cross-sectional shapes than triangular could be chosen, such as semi-circular, or rectangular.

In a preferred embodiment, connector assembly 22 includes mating details as shown at 100, 102 in FIG. 10 to assist in the alignment and compression of connector components 23, 24 within the process of the present invention. Alternate embodiments would permit the assembly of connector components 23, 24 without such alignment details, or would include a mechanism for joining connector components 23, 24 such as an adhesive, a mechanical latching mechanism or welding, including ultrasonic welding, to secure connector components 23, 24 to one another.

Figure 11:
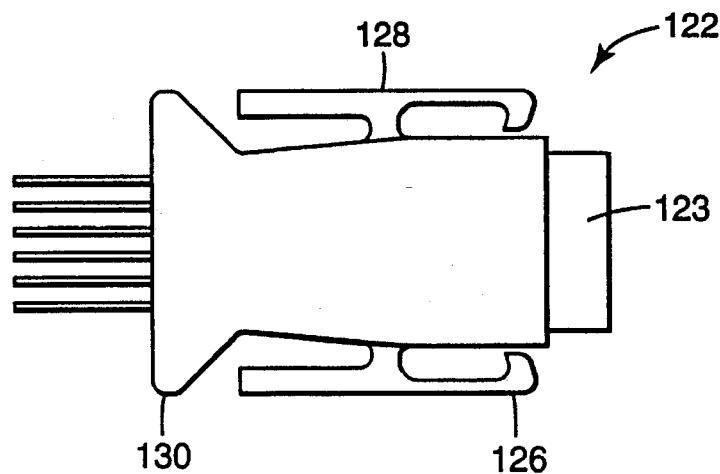
FIG. 11 is a top view of an alternate embodiment of the connector assembly of the present invention including mechanical attachment features.
Figure 12:
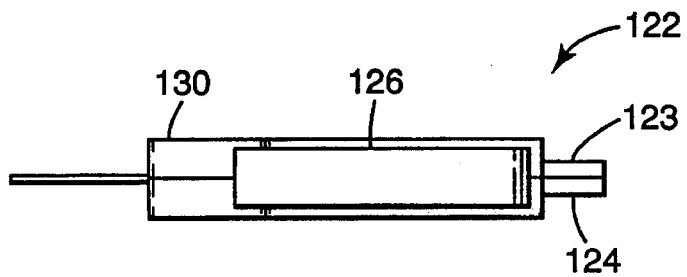
FIG. 12 is a side view of the alternate embodiment of the connector assembly shown in FIG. 11.

Referring now to FIGS. 11 and 12, an alternate embodiment of a connector assembly 122 in accordance with the present invention is shown. In this embodiment, an upper connector component 123, and lower connector component 124 are assembled as previously described. Connector assembly 122 includes additional structure in the form of mating attachments 126, 128 and flange 130 which are integrally formed with connector 122.

Figure 13:
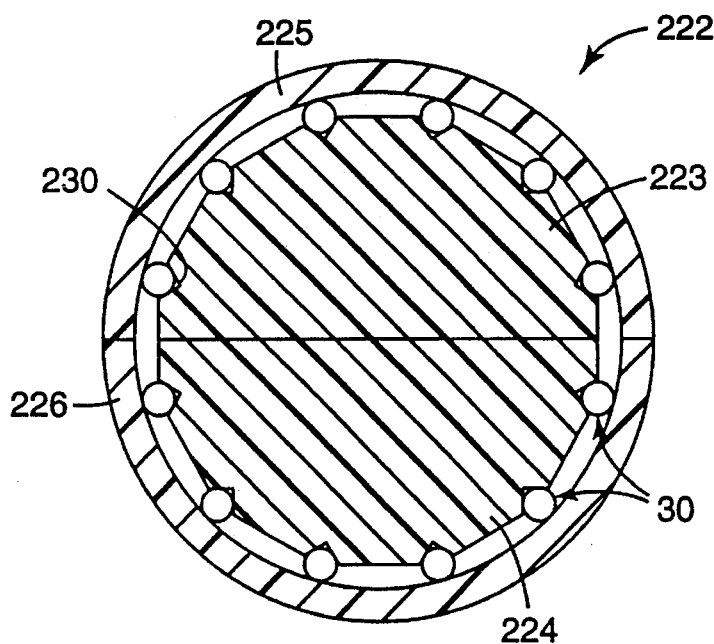
FIG. 13 is an end view of an alternate embodiment of a connector assembly.

Although the orientation of optical fibers 30 is generally planar in order to facilitate formation of a planar ribbon cable, alternate longitudinal arrangements of optical fibers 30 are also contemplated by the present invention. In an alternate embodiment of a connector assembly 222 shown in FIG. 13, connector halves 223, 224 have a non-planer orientation. In this embodiment, each connector half 223, 224 would comprise a semi-circular cross-sectional configuration having grooves 230 defined in a peripheral surface thereof and would also have a corresponding outer portion 225, 226 between which optical fibers 30 would be disposed. In this embodiment, for example, it would be possible to have optical fibers 30 braided in those segments of ribbon cable assembly 20 between connector halves 223, 224. At a point where connector assembly 222 is to be inserted, the braiding of optical fibers 30 would cease and optical fibers 30 would be directed on to grooves 230 of connector halves 223, 224. Although this embodiment suffers from the disadvantage of having a larger connector surface than would otherwise be required for a planer configuration of a like number of optical fibers 30, the remainder of fiber ribbon cable assembly 30 being configured in a braided and round cross-sectional configuration would offer symmetrical bend characteristics for the resulting final cable assembly.

Figure 14:
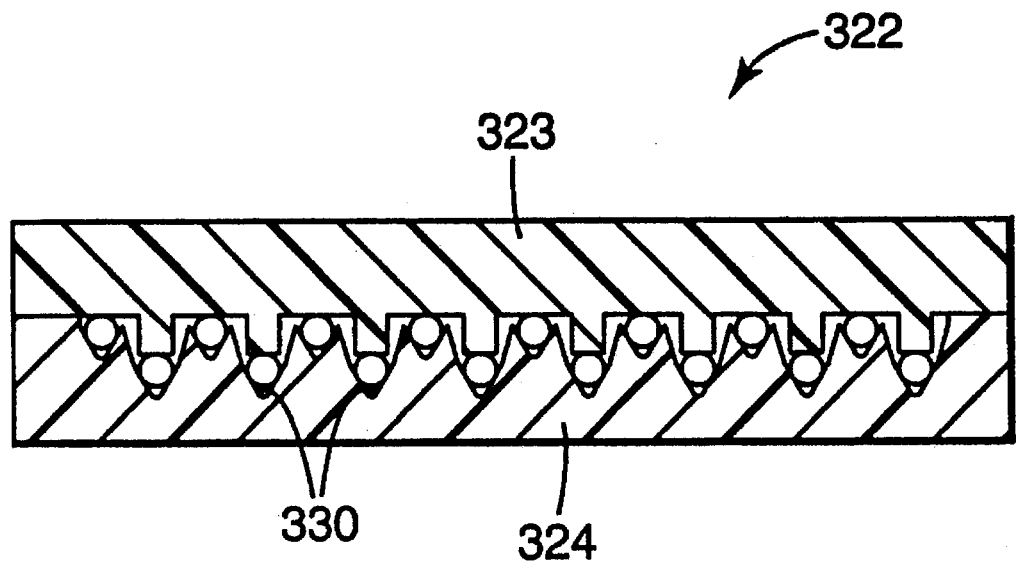
FIG. 14 is an end view of another alternate embodiment of a connector assembly.

In another alternate embodiment of a connector assembly 322 shown in FIG. 14, another non-planar orientation of optical fibers 30 is shown. In this embodiment, each connector component 323, 324 is similar to connector components 23, 24 except that groves 330 on one or both surfaces of connector components 323, 324 are arranged in a non-planar configuration. Such a non-planar configuration would be useful, for example, in a situation where a top row of optical fibers are being used for transmitted signal channels and a bottom row of optical fibers are being used for received signal channels.

In another alternate embodiment of a connector assembly 422 shown in FIG. 15, connector assembly 422 consists of four pieces 431, 432, 433 and 434, with upper connector component 423 being comprised of pieces 431 and 433 and lower connector component 424 being comprised of pieces 432 and 434. In this embodiment, connector components 423 and 424 are split in the middle so that only optical fibers 30 and tape layers 26, 27 need be severed perpendicular to the longitudinal orientation of optical fibers 30 in order to create a fiber optic ribbon cable assembly.

We claim:

1. A fiber optic ribbon cable assembly comprising:
   a pair of adhesive tape layers;
   a plurality of optical fibers arranged in a generally longitudinal orientation between the pair of adhesive tape layers with adjacent optical fibers positioned with an arbitrary lateral spacing relative to each other; and
   at least one connector assembly having at least a portion thereof disposed between the pair of adhesive tape layers and having the plurality of optical fibers disposed therein with adjacent optical fibers positioned with a fixed lateral spacing relative to each other.

2. The ribbon cable assembly of claim 1 wherein the arbitrary lateral spacing ranges from 0.0 to 2.0 cm.

3. The ribbon cable assembly of claim 1 wherein the pair of adhesive tape layers include an encapsulating layer and are the outermost jacket for the ribbon cable assembly.

4. The ribbon cable assembly of claim 1 wherein each of the pair of adhesive tape layers includes a pair of margin portions that extend laterally beyond a planar orientation of the plurality of optical fibers and wherein the pairs of margin portion are adhered to each other to form a seal along at least a portion of each of a longitudinal edge of the ribbon cable assembly.

5. The ribbon cable assembly of claim 1 wherein the pair of adhesive tape layers are each comprised of an outer protective member, an intermediate adhesive layer, and an inner encapsulating layer.

6. The ribbon cable assembly of claim 5 wherein one layer of material comprises both the intermediate adhesive layer and the inner encapsulating layer.

7. The ribbon cable assembly of claim 5 wherein the protective member is comprised of a material selected from the set of: plastic, metal, fabric or any combination thereof, the intermediate adhesive layer is comprised of a material selected from the set: of pressure sensitive adhesive, thermoset adhesive, thermoplastic adhesive, radiation-curable adhesive, mechanically interlocking structures or any combination thereof, and the inner encapsulating layer is comprised of a material selected from the set of: pressure sensitive adhesive, thermoset adhesive, thermoplastic adhesive, radiation-curable adhesive, gel, foam, fibrous material, deformable plastic or any combination thereof.

8. The ribbon cable assembly of claim 1 wherein the optical fibers each comprise a fiber optic core comprised of a material selected from the set of: glass, plastic or air, the fiber optic core being surrounded by an optical cladding layer comprised of a material selected from the set of: glass, plastic or metal.

9. The ribbon cable assembly of claim 8 wherein the optical fibers further include a buffer layer surrounding the optical cladding layer, the buffer layer comprised of a material selected from the set of: plastic, metal, carbon, ceramic or any combination thereof.

10. The ribbon cable assembly of claim 1 wherein the connector assembly comprises an upper connector component and a lower connector component, at least one of which includes structure for separating adjacent optical fibers into the fixed lateral spacing.

11. The ribbon cable assembly of claim 10 wherein each of the connector components includes at least a pair of laterally-oriented structures on an outer surface of the component that define a longitudinal center portion therebetween from which the pair of adhesive tape layers are removed.

12. The ribbon cable assembly of claim 10 wherein each of the connector components includes a longitudinal center portion which is cut generally perpendicular to the longitudinal orientation of the optical fibers subsequent to disposition of the connector assembly within the pair of adhesive tape layers to expose ends of the plurality of optical fibers which are disposed within a lateral cross-section of the connector assembly in the fixed lateral spacing.

13. The ribbon cable assembly of claim 10 wherein each of the connector components includes a longitudinal first half and a longitudinal second half such that the connector assembly comprises four pieces and the optical fibers are cut generally perpendicular to their longitudinal orientation subsequent to disposition of the connector assembly within the pair of adhesive tape layers between the first halves and second halves.

14. The ribbon cable assembly of claim 10 further comprising means for joining the connector components.

15. The ribbon cable assembly of claim 1 wherein the connector assembly includes a longitudinal center portion which is cut generally perpendicular to the longitudinal orientation of the optical fibers subsequent to disposition of the connector assembly within the pair of adhesive tape layers to expose ends of the plurality of optical fibers which are disposed within a lateral cross-section of the connector assembly in the fixed lateral spacing.

16. The ribbon cable assembly of claim 1 wherein the connector assembly includes at least a pair of laterally-oriented structures on at least one outer surface of the connector assembly that define a longitudinal center portion therebetween from which one of the pair of adhesive tape layers is removed.

17. The ribbon cable assembly of claim 16 wherein the structures include means for severing the adhesive tape layer during manufacture of the ribbon cable assembly.

18. The ribbon cable assembly of claim 1 wherein the connector assembly includes structure for separating the optical fibers such that the optical fibers are arranged in a non-planar configuration.

19. The ribbon cable assembly of claim 18 wherein the connector assembly includes at least two separate rows of grooves having different depths so as to position the optical fibers in a staggered lateral configuration.

20. The ribbon cable assembly of claim 18 wherein the connector assembly comprises a pair of connector components each having an inner and outer component with a semi-circular cross-sectional shape and at least one of which has grooves along an inner surface into which the optical fibers are disposed.

21. A method of manufacturing a fiber optic ribbon cable assembly comprising the steps of:
   (a) providing a plurality of optical fibers oriented in a generally longitudinal orientation;
   (b) arranging adjacent ones of the plurality of optical fibers in a fixed lateral spacing relative to each other;
   (c) applying a connector assembly onto a first longitudinal segment of the plurality of optical fibers;
   (d) sandwiching at least a second longitudinal segment of the plurality of optical fibers separate from the first longitudinal segment between a pair of adhesive tape layers to form a ribbon cable assembly having adjacent ones of the plurality of optical fibers maintained in an arbitrary lateral spacing relative to each other in the second longitudinal segment.

22. The method of claim 21 wherein step (a) is a continuous process of feeding the plurality of optical fibers from a corresponding plurality of spools of continuous optical fibers.

23. The method of claim 22 wherein an entire length of the ribbon cable assembly, including both the first and second longitudinal segments, is sandwiched between the pair of adhesive tape layers in step (d).

24. The method of claim 21 wherein step (d) is accomplished using at least a pair of rollers to compress the pair of adhesive tape layers together.

25. The method of claim 21 wherein step (b) is accomplished by passing the plurality of optical fibers through a fiber guide.

26. The method of claim 21 wherein steps (b) and (c) are accomplished simultaneously by providing structure within the connector assembly that defines the fixed lateral spacing.

27. The method of claim 21 wherein the connector assembly comprises an upper connector component and a lower connector component and wherein step (c) is accomplished by sandwiching the plurality of optical fibers between the upper connector component and the lower connector component.

28. The method of claim 27 wherein at least one of the connector components includes structure for separating adjacent optical fibers into the fixed lateral spacing and steps (b) and (c) are accomplished simultaneously.

29. The method of claim 27 wherein each of the connector components includes structure defining a longitudinal center portion and wherein the method further comprises the step of:
(e) cutting the center portion of the connector components generally perpendicular to the longitudinal orientation of the optical fibers to expose ends of the plurality of optical fibers which are disposed within a lateral cross-section of the connector assembly in the fixed lateral spacing.

30. The method of claim 27 wherein each of the connector components includes a longitudinal first half and a longitudinal second half such that the connector assembly comprises four pieces and wherein the method further comprises the step of:
(e) cutting the optical fibers generally perpendicular to their longitudinal orientation between the first halves and second halves of the connector components.

31. The method of claim 27 wherein step (c) includes the step of joining the connector components together by using a technique selected from the set comprising: adhering the connector components together, mechanically interlocking the connector components together, welding the connector components together, or any combination thereof.

32. The method of claim 21 wherein the connector assembly includes at least a pair of laterally-oriented structures on at least one outer surface of the connector assembly that define a longitudinal center portion therebetween and wherein the method further comprises the steps of:
(e) removing the pair of adhesive tape layers from the center portion; and
(f) cutting the center portion generally perpendicular to the longitudinal orientation of the optical fibers to expose ends of the plurality of optical fibers which are disposed within a lateral cross-section of the connector assembly in the fixed lateral spacing.

33. The method of claim 32 wherein step (e) is accomplished in part by the structures being provided with an edge for severing the adhesive tape layer during step (d).

34. The method of claim 21 wherein each of the pair of adhesive tape layers includes a pair of margin portions that extend laterally beyond a planar orientation of the plurality of optical fibers and wherein the method further comprises the step of:
(e) adhering the pairs of margin portions to each other to form a seal along at least a portion of each of a longitudinal edge of the ribbon cable assembly.

35. The method of claim 21 wherein the connector assembly includes a longitudinal center portion and wherein the method further comprises the step of:
(e) cutting the center portion generally perpendicular to the longitudinal orientation of the optical fibers to expose ends of the plurality of optical fibers which are disposed within a lateral cross-section of the connector assembly in the fixed lateral spacing.

36. The method of claim 21 wherein step (b) arranges the optical fibers in a non-planar configuration.

37. The method of claim 21 wherein the adhesive tape layers include an encapsulating layer and wherein step (d) does not include additional jacketing applied to the fiber optic cable assembly in order to protect the fiber optic cable assembly.

* * * * *